United States Patent
Tosi

(10) Patent No.: US 9,322,389 B2
(45) Date of Patent: *Apr. 26, 2016

(54) POWER GENERATION IN A TUBULAR STRUCTURE BY WAY OF ELECTROMAGNETIC INDUCTION

(71) Applicant: Chevron U.S.A. Inc., San Ramon, CA (US)

(72) Inventor: Luis Phillipe Costa Ferreira Tosi, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/134,512

(22) Filed: Dec. 19, 2013

(65) Prior Publication Data

US 2014/0103662 A1 Apr. 17, 2014

Related U.S. Application Data

(63) Continuation-in-part of application No. 13/224,074, filed on Sep. 1, 2011, now Pat. No. 8,624,419.

(51) Int. Cl.
| | |
|---|---|
| *F03B 17/06* | (2006.01) |
| *F03B 13/00* | (2006.01) |
| *F03B 13/02* | (2006.01) |
| *H02P 9/02* | (2006.01) |
| *H02P 25/06* | (2006.01) |
| *H02K 35/02* | (2006.01) |
| *H02J 7/14* | (2006.01) |

(52) U.S. Cl.
CPC ............... *F03B 17/06* (2013.01); *F03B 13/00* (2013.01); *F03B 13/02* (2013.01); *H02K 35/02* (2013.01); *H02P 9/02* (2013.01); *H02P 25/06* (2013.01); *H02J 7/1415* (2013.01); *Y02E 10/28* (2013.01)

(58) Field of Classification Search
CPC ... E21B 41/0085; E21B 47/122; H02K 35/04; H02K 35/02; F03B 17/06; F03B 13/00; F03B 13/02; Y02E 10/28; H02P 9/02; H02P 25/26; H02J 7/1415
USPC ............................................... 290/54
See application file for complete search history.

(56) References Cited

U.S. PATENT DOCUMENTS 5,839,508 A 11/1998 Tubel et al.
5,965,964 A 10/1999 Skinner et al.
(Continued)

OTHER PUBLICATIONS

International Search Report and Written Opinion PCT/US2012/052695 dated Nov. 6, 2012 (8 pages).

*Primary Examiner* — Michael Zarroli
(74) *Attorney, Agent, or Firm* — Paul Anderson; King & Spalding

(57) ABSTRACT

Electrical power may be generated by way of electromagnetic induction through oscillating linear translation driven by the flow of a fluid being transported through a tubular structure. In exemplary embodiments, a conductive coil is disposed in a fixed position along a length of a tubular structure such that the conductive coil encircles the tubular structure. A linear translation apparatus is disposed radially inward from the conductive coil and is configured to move linearly parallel to a longitudinal axis of the tubular structure and within the conducting coil by harnessing mechanical energy from fluid flowing within the tubular structure. Magnets are affixed to the linear translation apparatus to cause electrical power to be generated in the conductive coil by way of electromagnetic induction responsive to the magnets passing by the conductive coil when the linear translation apparatus is in motion.

12 Claims, 4 Drawing Sheets

(56) References Cited

U.S. PATENT DOCUMENTS

| | | | |
|---|---|---|---|
| 6,504,258 B2 * | 1/2003 | Schultz et al. | 290/1 R |
| 8,322,447 B2 * | 12/2012 | Loretz et al. | 166/374 |
| 8,624,419 B2 * | 1/2014 | Tosi | 290/54 |
| 8,704,387 B2 * | 4/2014 | Lemieux | 290/1 R |
| 2011/0057449 A1 * | 3/2011 | Marya et al. | 290/54 |
| 2012/0326536 A1 * | 12/2012 | Nair et al. | H01L 41/125 310/26 |

* cited by examiner

POWER GENERATION IN A TUBULAR STRUCTURE BY WAY OF ELECTROMAGNETIC INDUCTION

CROSS-REFERENCE TO RELATED APPLICATION

The present application is a continuation-in-part application of U.S. patent application Ser. No. 13/224,074, filed on Sep. 1, 2011, granted Jan. 7, 2014 as U.S. Pat. No. 8,624,419, assigned to Chevron U.S.A. Inc. and entitled "Downhole Power Generation By Way Of Electromagnetic Induction", the entire disclosure of which is hereby fully incorporated herein by reference.

TECHNICAL FIELD

The present application relates to generating electrical power by way of electromagnetic induction through oscillating linear translation driven by the flow of a fluid being transported through a tubular structure.

BACKGROUND

The energy industry has significant electrical power needs in all divisions of its business, including wells, pipelines, refineries, and other process facilities. For instance, providing electrical power to support electrical loads located in downhole positions of a production well (e.g., water, gas, and/or oil) is known for drilling, injection, stimulation, or completions operations. Such loads, for example, may include gauges, inflow control valves, electric submersible pumps, other completions equipment, and/or other electrical loads. In existing techniques, power is typically generated and/or stored above ground and transported down the well via electrical wires. Significant time may be spent during the operations in placing the wire. The monetary costs of the wire and spoolers are also non-trivial. Furthermore, such wires may be leave downhole equipment susceptible to power loss and/or interruption. In addition, refineries and other process facilities require electrical power for sensor systems consisting of pressure, temperature, fluid/chemical identification, and the like, and the required systems such as remote telemetry and computing to enable sensor function.

SUMMARY

One aspect of the disclosure relates to a system configured for generating electrical power by way of electromagnetic induction through oscillating linear translation driven by the flow of a fluid being transported by a tubular structure. The system comprises a power generation apparatus configured to be disposed at a position along a tubular structure. The tubular structure is configured to transport a fluid from one location to another. The power generation apparatus comprises a conductive coil, a linear translation apparatus, a fluid motion capture apparatus, and one or more magnets.

The conductive coil is disposed along a length of the tubular structure such that the conductive coil encircles the tubular structure. The conductive coil is in a fixed position relative to the tubular structure. The conductive coil is configured to be electrically coupled to an electrical load and/or a power storage apparatus. The electrical load and/or the power storage apparatus are disposed at a remote location.

The linear translation apparatus is disposed radially inward from the conductive coil. The linear translation apparatus is configured to move linearly parallel to a longitudinal axis of the tubular structure and within the conducting coil.

The fluid motion capture apparatus is affixed to the linear translation apparatus. The fluid motion capture apparatus is configured to harness mechanical energy from fluid flowing within the tubular structure to effectuate linear motion of the linear translation apparatus.

The one or more magnets are affixed to the linear translation apparatus. The one or more magnets are configured to cause electrical power to be generated in the conductive coil by way of electromagnetic induction responsive to the one or more magnets passing by the conductive coil when the linear translation apparatus is in motion.

The features of the present invention will be readily apparent to those skilled in the art upon a reading of the description of the preferred embodiments that follows.

BRIEF DESCRIPTION OF THE DRAWINGS

For a more complete understanding of the exemplary embodiments of the present invention and the advantages thereof, reference is now made to the following description in conjunction with the accompanying drawings, which are briefly described as follows.

DETAILED DESCRIPTION

Figure 1:
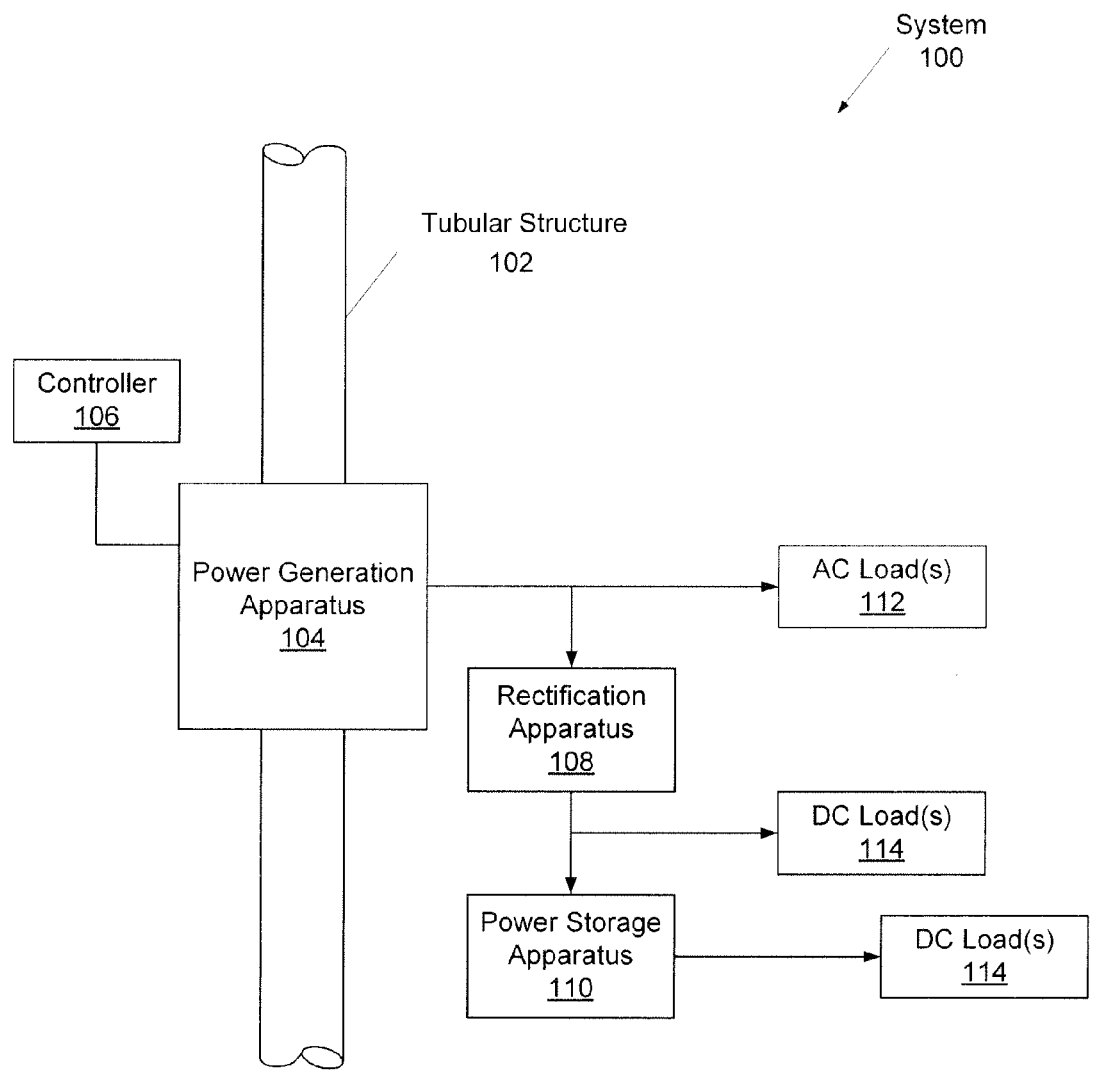
FIG. 1 illustrates a system configured for generating electrical power, in accordance with one or more embodiments.

The system of the present invention is configured for generating electrical power by way of electromagnetic induction through oscillating linear translation driven by the flow of a fluid being transported through a tubular structure. In certain embodiments, the system of the present invention is utilized for providing power for downhole operations, for example, during drilling, injection, stimulation, and/or completions operations. In other embodiments, the system is utilized for providing power in a processing facility, such as a refinery or production platform. One having ordinary skill in the art will recognize that the system of the present invention can be utilized to generate electrical power in any number of embodiments that includes fluid flow through a tubular structure, including pipelines. The system may harness mechanical energy from the flow of fluid being transported through a pipe or tubular structure in order to generate electrical power. More specifically, the flow may drive electromagnetic induction through oscillating linear translation.

Illustrative embodiments of the invention are described below. In the interest of clarity, not all features of an actual implementation are described in this specification. One of ordinary skill in the art will appreciate that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention may be better understood by reading the following description of non-limiting embodiments with reference to the attached drawings wherein like parts of each of the figures are identified by the same reference characters. The words and phrases used herein should be understood and interpreted to have a meaning consistent with the understanding of those words and phrases by those skilled in the relevant art. No special definition of a term or phrase, for example, a definition that is different from the ordinary and customary meaning as understood by those skilled in the art, is intended to be implied by consistent usage of the term or phrase herein. To the extent that a term or phrase is intended to have a special meaning, for instance, a meaning other than that understood by skilled artisans, such a special definition will be expressly set forth in the specification in a definitional manner that directly and unequivocally provides the special definition for the term or phrase.

FIG. 1 illustrates a system configured for generating electrical power, in accordance with one or more embodiments. As depicted in FIG. 1, system 100 can include one or more of a pipe, or tubular structure 102, a power generation apparatus 104, a controller 106, a rectification apparatus 108, a power storage apparatus 110, and/or other components. The depiction of system 100 in FIG. 1 is not intended to be limiting as system 100 may include more or less components than those shown. Additionally, two or more components may be combined as singular components.

In certain embodiments, the tubular structure 102 is disposed within a production well. In certain other embodiments, the tubular structure 102 is located within a refinery or other process facility. In yet other embodiments, the tubular structure 102 is a pipeline. The tubular structure 102 can be positioned in any location and is configured to transport a fluid from one location to another. In certain embodiments, the fluid transported by tubular structure 102 may include a fluid being extracted from a well (e.g., oil or gas), a fluid being injected into a well (e.g., drilling fluid, water, completion fluid, brines, fracturing fluids), or any fluid being processed in a facility. In certain embodiments, the fluid may be under negative pressure created by a pump.

The power generation apparatus 104 is configured to be disposed at a position along tubular structure 102. The power generation apparatus 104 generates electrical power by way of electromagnetic induction through oscillating linear translation driven by the flow of a fluid being transported by tubular structure 102. The electrical power generated by power generation apparatus 104 is alternating current. As such, one or more AC loads 112 requiring alternating current electrical power may receive electrical power directly from power generation apparatus 104, in some embodiments. The AC load(s) 112 may be disposed at a remote position. The alternating current electrical power generated by power generation apparatus 104 may be transformed to a different voltage by a transformer (not depicted). The frequency of the alternating current electrical power generated by power generation apparatus 104 may be altered by a frequency converter (not depicted). Exemplary embodiments of power generation apparatus 104 are described in further detail in connection with FIG. 2.

The controller 106 may be configured to control one or more components of system 100. In some embodiments, controller 106 may include one or more processors (not depicted) configured to execute computer software modules, electronic storage (not depicted) configured to store information received from or used by the one or more processors, and/or other components facilitating functionalities of controller 106 described herein. In some embodiments, controller 106 communicates wirelessly with a controller located at a remote location, such as above the Earth's surface. As such, components of system 100 may be controlled without the use of control lines. Various functions of controller 106 are discussed in further detail herein.

The rectification apparatus 108 is configured to convert alternating current electrical power generated by power generation apparatus 104 to direct current electrical power. The power storage apparatus 110 is configured to store direct current electrical power received from rectification apparatus 108. The power storage apparatus 110 may include one or more batteries, one or more capacitors, and/or other power storage devices. The direct current electrical power may be used by one or more DC loads 114 requiring direct current electrical power directly from rectification apparatus 108 and/or from power storage apparatus 110, according to various embodiments. The DC load(s) 114 may be disposed at a remote position.

Figure 2:
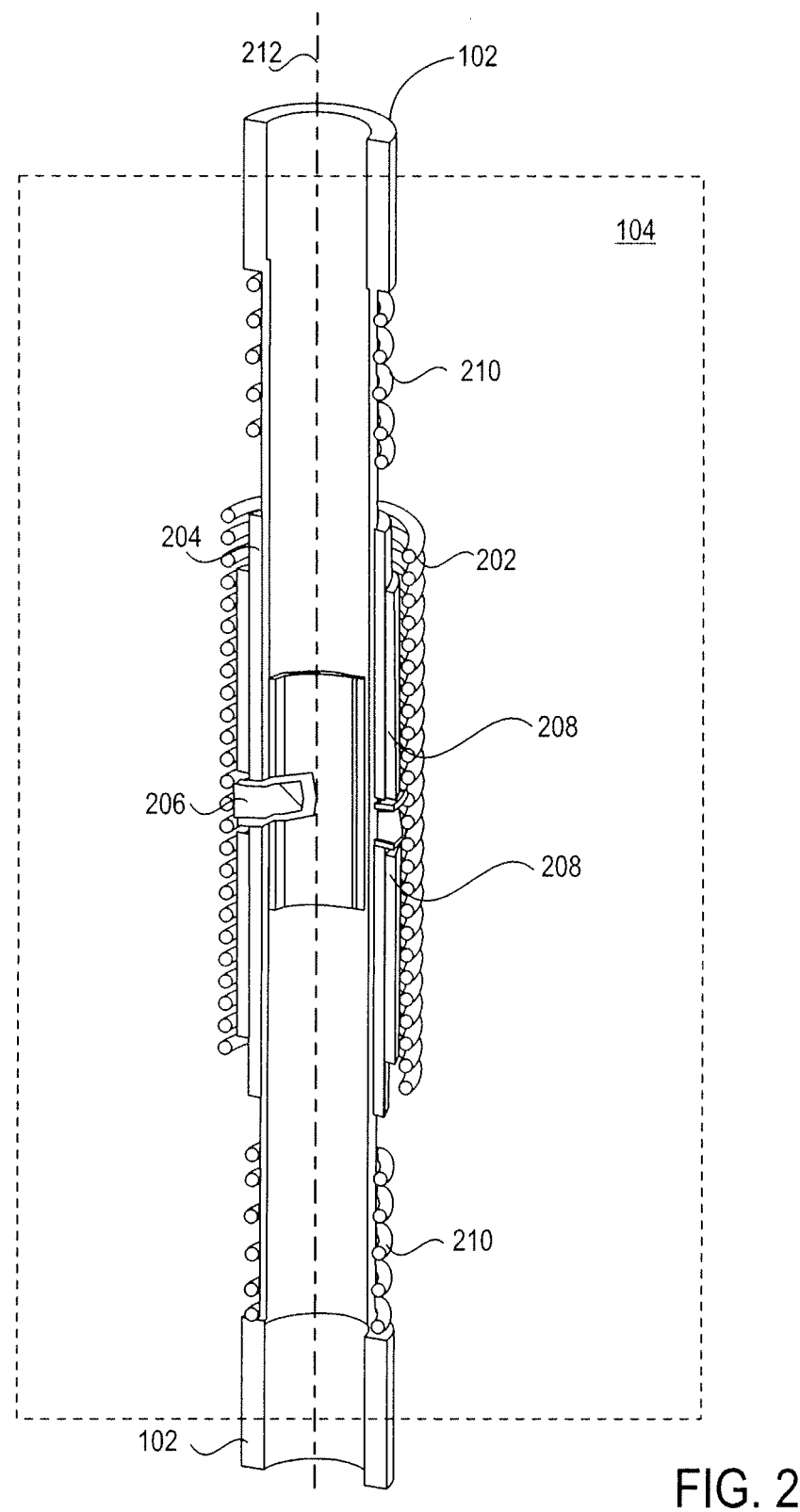
FIG. 2 illustrates a power generation apparatus, in accordance with one or more embodiments.

FIG. 2 illustrates power generation apparatus 104 of FIG. 1, in accordance with one or more embodiments. As indicated above, power generation apparatus 104 generates electrical power by way of electromagnetic induction through oscillating linear translation driven by the flow of a fluid being transported by tubular structure 102. As depicted in FIG. 2, power generation apparatus 104 can include one or more of a conductive coil 202, a linear translation apparatus 204, a fluid motion capture apparatus 206, one or more magnets 208, one or more spring(s) 210, and/or other components. The depiction of power generation apparatus 104 in FIG. 2 is not intended to be limiting as power generation apparatus 104 may include more or less components than those shown. Additionally, two or more components may be combined as singular components. For example, power generation apparatus 104 may include one or more sealing mechanisms to prevent fluid from escaping from tubular structure 102. As another example, one or more components of power generation apparatus 104 may be encased to protect those components from a local environment.

The conductive coil 202 is disposed along a length of tubular structure 102 such that conductive coil 202 encircles tubular structure 102. The conductive coil 202 is in a fixed position relative to tubular structure 102, in accordance with some embodiments. The conductive coil 202 may be formed of a conducting material suitable for electromagnetic induction. The conductive coil 202 is configured to be electrically coupled to an electrical load (e.g., AC load(s) 112 and/or DC load(s) 114), a rectification apparatus (e.g., rectification apparatus 108), a power storage apparatus (e.g., power storage apparatus 110), and/or other electrical components.

The linear translation apparatus 204 is disposed radially inward from conductive coil 202. The linear translation apparatus 204 is configured to move linearly, parallel to a longitudinal axis 214 of tubular structure 102 and within conductive coil 202. The linear motion of 204 is oscillatory, in accordance with some embodiments. The linear translation apparatus 204 is described in further detail in connection with FIG. 3.

The fluid motion capture apparatus 206 is affixed to linear translation apparatus 204. The fluid motion capture apparatus 206 is configured to harness mechanical energy from fluid flowing within tubular structure 102 to effectuate linear motion of linear translation apparatus 204. In some embodiments, fluid motion capture apparatus 206 can include one or more of an actuating mechanism configured to alternately engage and disengage from the fluid flowing within tubular structure 102. Such an actuating mechanism may be controlled by controller 106. By way of illustration, a fluid may be flowing in an upward direction in tubular structure 102. The linear translation apparatus 204 may be driven upward responsive to fluid motion capture apparatus 206 engaging the fluid flow, and return downward responsive to fluid motion capture apparatus 206 disengaging the fluid flow. The fluid motion capture apparatus 206 is described in further detail in connection with FIG. 3.

The magnet(s) 208 are affixed to linear translation apparatus 204. The magnet(s) 208 are configured to cause electrical power to be generated in conductive coil 202 by way of electromagnetic induction responsive to magnet(s) 208 passing by conductive coil 202 when linear translation apparatus 204 is in motion.

In FIG. 2, spring(s) 210 are depicted as being disposed proximate to endpoints of a range of motion of linear translation apparatus 204. In some embodiments, spring(s) 210 are disposed at opposing ends of linear translation apparatus 204. The spring(s) 210 are configured to facilitate linear oscillation of linear translation apparatus 204.

By tuning various metrics associated with power generation apparatus 104, linear translation apparatus 204 may be driven at a desired oscillatory frequency, which may affect the frequency of alternating current electrical power generated by power generation apparatus 104. Such metrics may include a rate of flow of fluid in tubular structure 102, a spring constant associated with spring(s) 210, mechanical motion harnessing characteristics of fluid motion capture apparatus 206, a weight of individual components of power generation apparatus 104, length of a range of motion of linear translation apparatus 204, strength of magnetic field of magnet(s) 208, resistivity of conductive coil 202, number of loops of conductive coil 202, and/or other metrics. The amplitude of alternating current electrical power generated by power generation apparatus 104 may also by adjusted by tuning one or more of these metrics.

Figure 3:
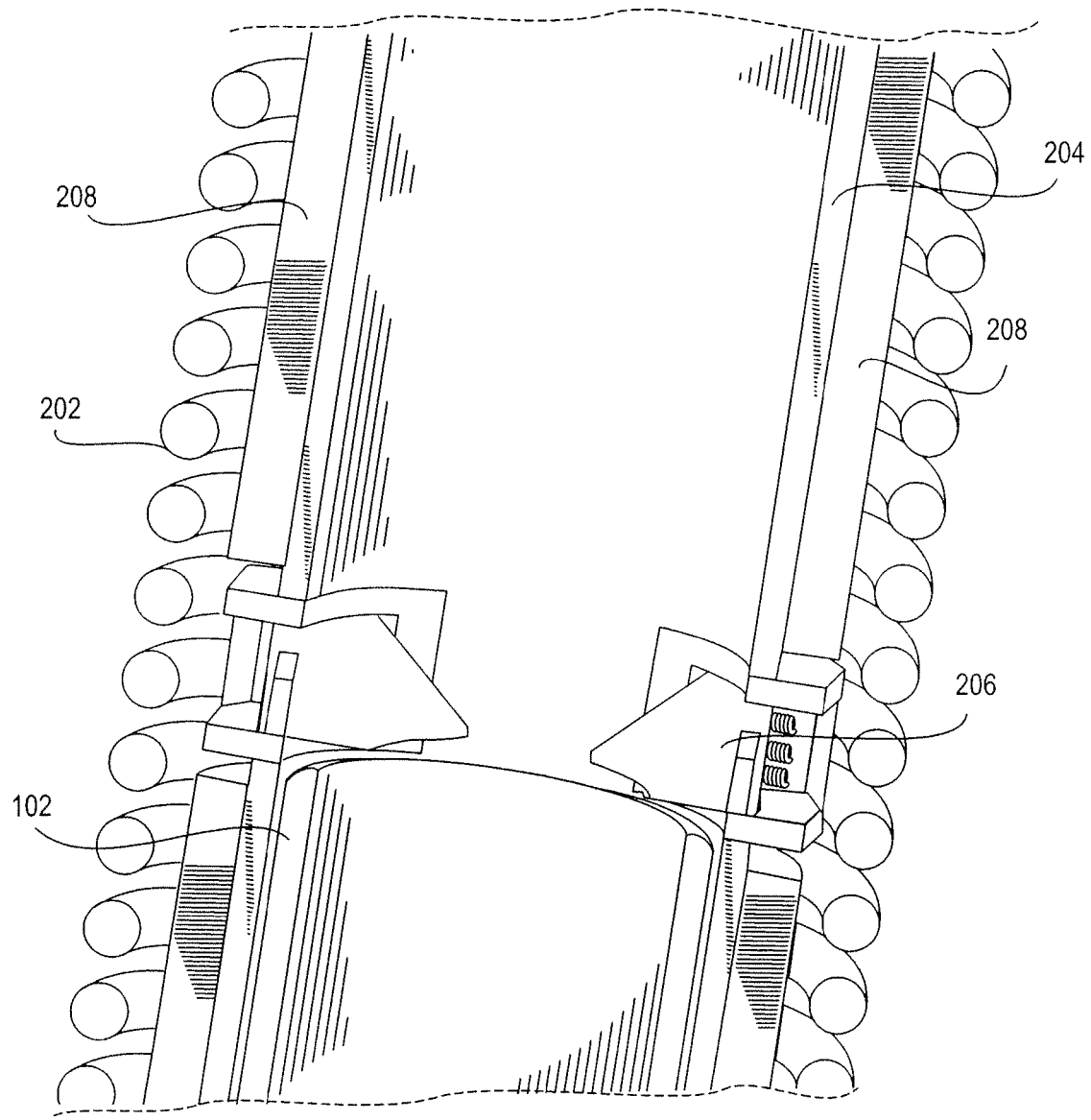
FIG. 3 illustrates a linear translation apparatus, in accordance with one or more embodiments.

FIG. 3 illustrates linear translation apparatus 204 of FIG. 2, in accordance with one or more embodiments. Here, linear translation apparatus 204 is shown as fitting over tubular structure 102. As indicated above, conductive coil 202 is in a fixed position relative to tubular structure 102. The fluid motion capture apparatus 206 and magnet(s) 208 are affixed to linear translation apparatus 204. The fluid motion capture apparatus 206 may engage a fluid flowing in tubular structure 102 by contracting inward, and may disengage from the fluid by dilating outward. When fluid motion capture apparatus 206 engages the fluid flowing in tubular structure 102, linear translation apparatus 204 may move within its range of motion in the direction of flow of the fluid. The linear translation apparatus 204 may move within its range of motion in the opposite direction of flow of the fluid in tubular structure 102 when fluid motion capture apparatus 206 disengages the fluid.

Figure 4:
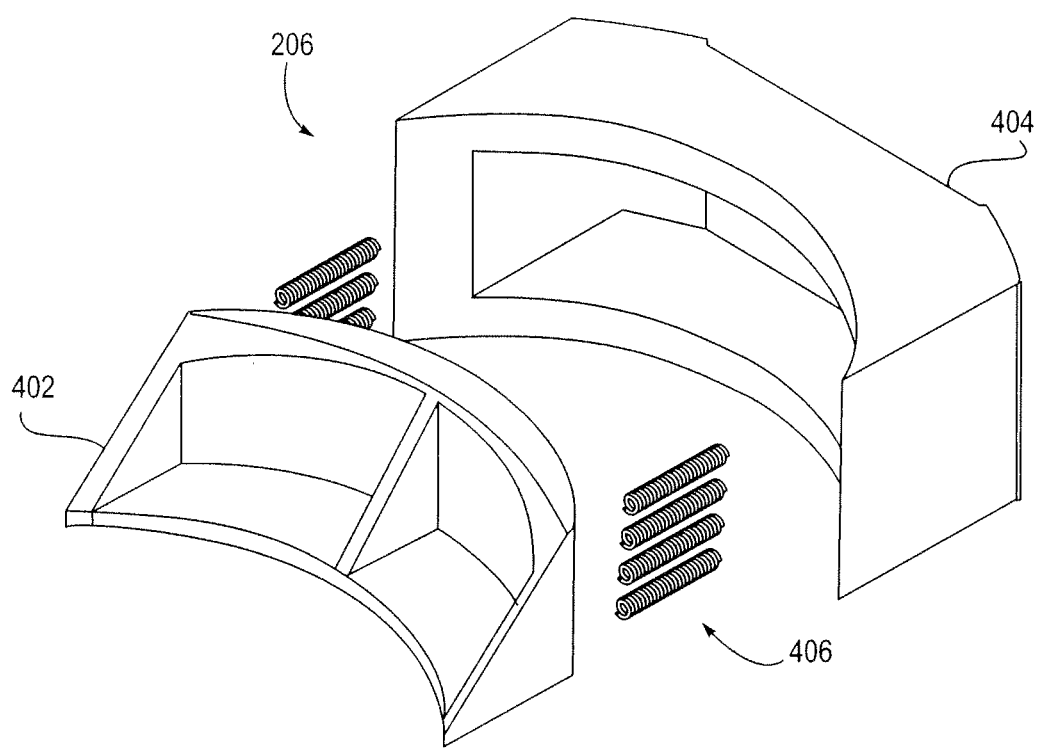
FIG. 4 illustrates a fluid motion capture apparatus, in accordance with one or more embodiments.

FIG. 4 illustrates fluid motion capture apparatus 206 of FIG. 2, in accordance with one or more embodiments. As depicted in FIG. 4, fluid motion capture apparatus 206 can include one or more of a flange 402, a flange bracket 404, one or more springs 406, and/or other components. The depiction of fluid motion capture apparatus 206 in FIG. 4 is not intended to be limiting as fluid motion capture apparatus 206 may include more or less components than those shown. Additionally, two or more components may be combined as singular components. For example, fluid motion capture apparatus 206 may include a mechanism of actuating flange 402 in order to engage and disengage fluid flowing in tubular structure 102. Furthermore, it will be appreciated that other approaches for engaging and disengaging fluid flowing in tubular structure 102 are contemplated.

The flange bracket 404 may attach to linear translation apparatus 204 (see FIGS. 2 and 3). The flange 402 may couple with flange bracket 404 such that flange 402 moves inward and outward within tubular structure 102. The spring(s) 406 may facilitate contraction of flange 402. Controller 106 (see FIG. 1) may be configured to control contraction and/or dilation of flange 402. Such control may facilitate adjustment of power generation characteristics (e.g., frequency and/or amplitude) of power generation apparatus 104.

For downhole operations, by generating electrical power at a downhole position, rather than at the Earth's surface, electrical power can be delivered to downhole electrical loads (e.g., gauges, inflow control valves, electric submersible pumps, other equipment, and/or other electrical loads) without the use of electrical wires running down the well from the surface. Significant time may be saved during downhole operations without having to place such wires. Cost savings may be realized by avoiding the use of downhole wires and spoolers. Furthermore, local electrical power generation and delivery may alleviate power loss and/or interruption to downhole equipment. Similarly, in process facilities, generating electrical power enables remote sensing equipment that would require cabling over long lengths of pipe to isolated zones of production, including unmanned production platforms, deep within a refinery structure, or in isolated or desolate areas pipelines must cross. Cost savings are realized by replacement of wires and spoolers connecting with such location, but more predominantly by increasing system reliability associated with the loss of operation time due to failure of such existing wired systems.

Although the technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A system configured for generating electrical power by way of electromagnetic induction through oscillating linear translation driven by flow of a fluid being transported by a tubular structure, the system comprising:

a power generation apparatus disposed at a position along a tubular structure, having a longitudinal axis with substantially parallel sides, the power generation apparatus comprising:

a conductive coil disposed along a length of the tubular structure such that the conductive coil encircles the tubular structure, the conductive coil being in a fixed position relative to the tubular structure, the conductive coil being electrically coupled to an electrical load and/or a power storage apparatus, the electrical load and/or the power storage apparatus being disposed at a remote position;

a linear translation apparatus disposed radially inward from the conductive coil, the linear translation apparatus being attached to the tubular structure in a slidable manner such that it is able to move linearly and parallel to a longitudinal axis and substantially parallel to the sides of the tubular structure and within the conducting coil;

a fluid motion capture apparatus affixed to the linear translation apparatus and connected to a controller, the fluid motion capture apparatus comprising an actuating mechanism, wherein the actuating mechanism comprises a mechanism that moves the fluid motion capture apparatus between at least two states when actuated by the controller:
a) a disengaged state, and
b) an engaged state, where the fluid motion capture apparatus is positioned further towards the radial center of the tubular member than when in the disengaged state; and
one or more magnets affixed to the linear translation apparatus.

2. The method of claim 1, wherein the actuating mechanism comprises springs.

3. The method of claim 1, wherein the actuating mechanism comprises an actuating flange.

4. The system of claim 1, further comprising one or more springs configured to facilitate linear oscillation of the linear translation apparatus.

5. The system of claim 1, wherein individual ones of the one or more springs are disposed proximate to one or both endpoints of a range of motion of the linear translation apparatus.

6. The system of claim 1, wherein individual ones of the one or more springs are disposed at opposing ends of the linear translation apparatus.

7. The system of claim 1, further comprising a rectification apparatus configured to convert electrical power generated by the power generation apparatus to direct current electrical power.

8. The system of claim 7, wherein the power storage apparatus is configured to store direct current electrical power received from the rectification apparatus.

9. The system of claim 1, wherein the power storage apparatus includes one or both of a battery or a capacitor.

10. The system of claim 1, wherein the tubular structure is a production pipe of a production well.

11. The system of claim 1, wherein the tubular structure is a drill pipe in a well.

12. The system of claim 1, wherein the tubular structure is a pipeline for transporting downhole fluids from one location to another.

* * * * *